US007225693B2

(12) United States Patent
Imanishi

(10) Patent No.: US 7,225,693 B2
(45) Date of Patent: Jun. 5, 2007

(54) SLIDE DRIVE DEVICE FOR A PRESS

(75) Inventor: Shozo Imanishi, Sagamihara (JP)

(73) Assignee: Aida Engineering Co., Ltd., Kanagawa (JP)

(*) Notice: Subject to any disclaimer, the term of this patent is extended or adjusted under 35 U.S.C. 154(b) by 41 days.

(21) Appl. No.: 09/846,703

(22) Filed: Apr. 30, 2001

(65) Prior Publication Data

US 2001/0039888 A1 Nov. 15, 2001

(30) Foreign Application Priority Data

May 11, 2000 (JP) .......................... 2000-138302

(51) Int. Cl.
*F16H 21/00* (2006.01)

(52) U.S. Cl. .................................... 74/25; 100/257

(58) Field of Classification Search ................ 83/530; 100/257, 258, 282; 74/604, 52, 590, 25
See application file for complete search history.

(56) References Cited

U.S. PATENT DOCUMENTS 2,105,053 A * 1/1938 Patrick ...................... 100/271
2,753,937 A * 7/1956 Bottenhorn ................. 83/623
4,235,130 A * 11/1980 Dulger et al. ................ 74/831
4,276,823 A * 7/1981 Rotzler ...................... 100/257
4,318,325 A * 3/1982 Bareis et al. .......... 100/257 X
4,419,929 A * 12/1983 Dommer et al. ........... 100/257
4,630,516 A 12/1986 Koch et al. .................. 83/530
4,660,452 A * 4/1987 Leinhaas ..................... 83/530
4,800,777 A * 1/1989 Imanishi et al. ............. 74/604
4,817,456 A * 4/1989 Imanishi et al. ............. 74/604
5,226,337 A * 7/1993 Imanishi et al. ........... 74/52 X
5,848,568 A * 12/1998 Imanishi .................... 100/257
5,860,318 A * 1/1999 Thomas ......................... 74/40
2002/0020307 A1* 2/2002 Imanishi .................... 100/257

OTHER PUBLICATIONS

Patent Abstracts of Japan, vol. 1995, No. 8, Sep. 29, 1995 & JP 07 132400 A (Yamada Dobby Co Ltd), May 23, 1995 * abstract; figures. *
Patent Abstracts of Japan, vol. 2000, No. 13, Feb. 5, 2001 & JP 2000 280094 A (Aida Eng Ltd), Oct. 10, 2000 * abstract; figures. *

(Continued)

*Primary Examiner*—Richard Ridley
*Assistant Examiner*—James Pilkington
(74) *Attorney, Agent, or Firm*—Darby & Darby

(57) ABSTRACT

A slide drive device for a press changes a slide stroke without a changing either a top or bottom dead center position of a slide. The slide drive device allows stroke adjustment without a loss of left-right balance in the slide drive device. An adjusting mechanism is driven by an eccentric part and a crank shaft. The adjusting mechanism is adaptable to fix either the top or bottom dead center position. A linear guide mechanism, is driven by the adjusting mechanism, and transfers adjustments in slope angle into changes in stroke relative to either the top or bottom dead center position without requiring a change in the dead center position. Alternate embodiments allow positioning and adjustment for convenience and economy.

38 Claims, 10 Drawing Sheets

OTHER PUBLICATIONS

Patent Abstracts of Japan, vol. 1999, No. 8, Jun. 30, 1999 & JP 11 077398 A (Nippon Densan Kiyoori KK), Mar. 23, 1999 * abstract; figures. *

Patent Abstracts of Japan, vol. 1999, No. 12, Oct. 29, 1999 & JP 11 197888 A (Nippon Densan Kiyoori KK), Jul. 27, 1999 * abstract; figures. *

Patent Abstracts of Japan, vol. 1998, No. 9, Jul. 31, 1998 & JP 10 109193 A (Aida Eng Ltd), Apr. 28, 1998 * abstract; figures. *

Patent Abstracts of Japan, vol. 2000, No. 2, Feb. 29, 2000 & JP 11 320187 A (Aida Eng Ltd), Nov. 24, 1999 * abstract; figures. *

European Search Report.

* cited by examiner

SLIDE DRIVE DEVICE FOR A PRESS

BACKGROUND OF THE PRESENT INVENTION

1. Field of the Invention

The present invention relates to a slide drive device for a press. The slide drive device provides a stroke adjusting function in which a dead center position is fixed and a slide strike is adjustable. The dead center position may be either a top or bottom dead center position.

2. Description of the Related Art

Japanese Laid Open Patent Publication Numbers 7-132400,11-77398, and 11-197888 are examples of slide drive devices for presses that use links equipped with a stroke adjusting function.

In Japanese Laid-Open Patent Publication Number 7-132400, the slide stroke can be changed with an adjustment at one position. Making a stroke correction is difficult in this device since the adjustment position is at a branching point for a left and right drive. When the stroke is changed, the bottom dead center position also changes. When the stroke is lengthened, mechanical acceleration at the top dead center is greatly increased.

In Japanese Laid-Open Patent Publication Number 11-77398, the left and right slides have separate slide stroke adjustment mechanism. Each mechanism must be adjusted separately. During use, there is a loss of precision due to operational backlash. During adjustment, each slide must be adjusted individually. Since each mechanism is separate there may be a loss of left-right balance. Further, although the bottom dead center position does not change with the change in the stroke, the pitch between the points cannot be narrowed by the adjusting mechanism disclosed.

As in the previous device, in Japanese Laid-Open Patent Publication Number 11-197888, a slide stroke is similarly adjusted between separate left and right slides. When the precision of the adjustment mechanism deteriorates, there is the possibility of a breakdown of balance between the left and right side.

OBJECT AND SUMMARY OF THE PRESENT INVENTION

It is an object of the present invention to provide a slide drive device for a press machine.

It is another object of the present invention to provide a slide drive device for a press where either a bottom or a top dead position does not change during slide stroke adjustment.

It is another object of the present invention to provide a slide drive device for a press machine where there is no loss of left-right balance during slide stroke adjustment.

It is another object of the present invention to provide a slide drive device where an adjusting function occurs before a left-right drive branching.

It is another object of the present invention to provide a slide drive device where a top or bottom dead center position can be changed smoothly with high precision.

It is another object of the present invention to provide a slide drive device with a guide board that can be pivoted to a specified angle and change a slope of a connecting rod without changing a top or bottom dead center position.

It is another object of the present invention to provide a slide drive device where the adjustment of a slide stroke does not directly effect the precision of the press.

It is another object of the present invention to provide a slide drive device where the motion of a connecting rod can be converted with high precision to a reciprocating motion along a linear trajectory.

It is another object of the present invention to provide a slide drive device where the motion of a connecting rod can be converted with high precision to a reciprocating motion along an arc-shaped trajectory through a trajectory forming link.

It is another object of the present invention to provide a slide drive device where the slope of an arc-shaped trajectory can be change by pivoting a guide board a specified angle.

It is another object of the present invention to provide a slide drive device where the top or bottom dead center position of the small end of a connecting rod remains the same while a top or bottom dead center position can be changed smoothly.

It is another object of the present invention to provide a slide drive device where a pin, connecting a connecting link with a drive branching link, has a reciprocating motion along a vertical line and maintains a left-right balance with high precision.

It is another object of the present invention to provide a slide drive device where a drive branching link reciprocates substantially linearly and maintains a left-right balance with a low number of parts and simple mechanism.

Briefly state, the present invention relates to slide drive device for a press which allows a change in slide stroke without a change in a top or bottom dead center position of a slide. The slide drive device also allows stroke adjustment without a loss of left-right balance in the slide drive device. An adjusting mechanism is driven by an eccentric part of a crank shaft. The adjusting mechanism is adaptable to fix either the top or bottom dead center position on customer demand. A linear guide mechanism, driven by the adjusting mechanism, transfers adjustments in slope angle into changes in slide stroke relative to either the top or bottom dead center position without requiring a change in the dead center position. Alternate embodiments allow positioning and adjustment for convenience and economy.

According to an embodiment of the present invention, there is provided, a slide drive device for a press machine having a slide, comprising: means for adjusting the slide drive device, the adjusting means being effective to adjust a stroke of the slide, the adjusting means being pivotable about a center position to adjust the stroke, the center position being one of a top and a bottom dead center position of the slide, the adjusting means receiving a reciprocating motion, means for guiding the slide drive device, a connecting link, the connecting link operably transferring the reciprocating motion to the guiding means, the guiding means being effective to convert the reciprocating motion to a guiding displacement, at least one drive branching link in the guiding means, at least one of a first and a second upper toggle means, the one upper toggle means being effective to transfer the guiding displacement to the slide and drive the slide through a cycle, and the at least one drive branching link being effective to transfer the guiding displacement to the one upper toggle means whereby the slide operates in the cycle.

According to an embodiment of the present invention, there is provided, a slide drive device for a press machine having a slide, further comprising: a connecting rod, the connecting rod slidably affixed to the adjusting means, a crank shaft; an eccentric part on the crank shaft, the eccentric part having an reciprocating motion, the connecting rod connects the eccentric part to the adjusting means, and the connecting rod operably transfers the reciprocating motion to the adjusting means where by the slide operates through the cycle.

According to an embodiment of the present invention, there is provided, a slide drive device for a press machine having a slide wherein: the center position is one of a top and a bottom dead center position of the slide, the adjustment means is slidably affixed to the connecting rod, the adjusting means is operable to guide the connecting rod along a specified trajectory, and the adjusting means is pivotable about the center position to adjust the specified trajectory.

According to an embodiment of the present invention, there is provided, a slide drive device for a press machine having a slide, further comprising: the first and the second upper toggle means, a rotation center on each the first and second upper toggle means, the rotation center permitting the first and second upper toggle means to rotate in an arc, a first link connects each the rotation center to the at least one drive branching link, the at least one drive branching link effective to transfer the guiding displacement to each the first and second upper toggle link means, a first and a second lower toggle link, a second link operably connects each the rotation center to each the respective lower toggle link, and the first and second upper toggle means operably transfer the guiding displacement through the second links to respective first and second lower toggle links and the slide whereby the slide operates through the cycle while maintaining a left and right balance.

According to an embodiment of the present invention, there is provided, a slide drive device for a press machine having a slide, further comprising: a guide board in the adjusting means, a groove in the guide board, a slider being slidable in the groove, a pin extending from the slider, the groove and the pin being pivotable about the center position, one end of a first and second end of the connecting rod, the one end operable about the pin, and the slider and the pin being effective to transfer the reciprocating motion to the connecting link and the guiding means.

According to an embodiment of the present invention, there is provided, a slide drive device for a press machine having a slide, further comprising: a base in the guiding means, a groove in the base, the groove being along a centerline between the upper toggle means, a slider being slidable in the groove, the connecting link operably connected to the slider, the connecting link transferring the reciprocating motion to the slider whereby the slider operates along the centerline, the at least one drive branching link operably connected to the slider, and the at least one drive branching link and the slider transferring the guiding displacement to the first and second upper toggle means whereby the slide operates through the cycle while maintaining a left and right balance along the centerline.

According to an embodiment of the present invention, there is provided, a slide drive device for a press machine having a slide, further comprising, a trajectory pin, a trajectory forming link, the trajectory pin in the adjusting means, the trajectory pin opposite the center position on the guide board, the trajectory forming link operably connecting the trajectory pin to the first end of the connecting rod, the trajectory pin, the trajectory forming link, and the adjusting means effective to convert the reciprocating motion of the first end to an arc-shaped trajectory.

According to an embodiment of the present invention, there is provided, a slide drive device for a press machine having a slide, wherein: the adjusting means is operable at a position equidistant between the first and second upper toggle means, the crank shaft and the eccentric part is below the adjusting means, and the guide means is above the adjusting means opposite the crank shaft.

According to an embodiment of the present invention, there is provided, a slide drive device for a press machine having a slide, further comprising: a first and second dynamic balancer, a first and second retention link, the first and second retention links on the first and second upper toggle means, the first and second dynamic balancers operably connected to each respective the first and second retention links through the retention links, the first and second dynamic balancers having a shape and a weight adaptable to each respective the first and second upper toggle link and the slide, and the first and second balancers at positions to minimize vibrations when the first and second upper toggle links drive the slide in the cycle.

According to an embodiment of the present invention, there is provided, a slide drive device for a press machine having a slide, further comprising: a first pin in each the first and second upper toggle means, the first links connects the first pins to each respective the rotation center on each the first and second upper toggle means, the at least one drive branching link operably connecting the first and second upper toggle means at the first pins on a common inner tangent line to each the arc.

According to an embodiment of the present invention, there is provided, a slide drive device for a press machine having a slide, further comprising: a first, second, and third element on the drive branching link, a the second element between the first and second elements, the second element being a central support pin, the first and third elements being on each respective the first support pin, and the connecting link operably connecting to the drive branching link at one of the first, second, and third elements.

According to an embodiment of the present invention, there is provided, a slide drive device for a press machine having a slide, further comprising: a first and second dynamic balancer, a first and second retention link, the first and second retention links on the second links of each first and second upper toggle means, the first and second dynamic balancers operably connected to each respective the first and second retention links through the retention links, the first and second dynamic balancers having a shape and a weight adaptable to each respective the first and second upper toggle link and the slide, and the first and second balancers at positions to minimize vibrations when the first and second upper toggle links drive the slide in the cycle.

According to an embodiment of the present invention, there is provided, a slide drive device for a press machine having a slide, further comprising: the connecting link operably connects to the drive branching link at the second element, and the drive shaft and the adjusting means are above the first and second upper toggle means and the drive branching link.

According to an embodiment of the present invention, there is provided, a slide drive device for a press machine having a slide, further comprising: the connecting link operably connects to the drive branching link at one of the first and third elements, and the drive shaft and the adjusting means are below the first and second upper toggle means and the drive branching link.

According to an embodiment of the present invention, there is provided, a slide drive device for a press machine having a slide, further comprising: the connecting link operably connects to the drive branching link at one of the first and third elements, the drive shaft is below the first and second upper toggle means, the adjusting means is above the first and second upper toggle means opposite the drive shaft, and the guiding means is between the drive shaft and the adjusting means.

According to an embodiment of the present invention, there is provided, a slide drive device for a press machine having a slide, further comprising: the connecting link operably connects to the drive branching link at one of the first and third elements, the drive shaft above the first and second upper toggle means, the adjusting means below the first and second upper toggle means opposite the drive shaft, and the guiding means is between the drive shaft and the adjusting means.

According to an embodiment of the present invention, there is provided, a slide drive device for a press machine having a slide, further comprising: a first end and second end element on the drive branching link, the first end element at a first end of the drive branching link, the second end element on the drive branching link, and the connecting link operably connecting to the drive branching link between the first end element and the second end element.

According to an embodiment of the present invention, there is provided, a slide drive device for a press machine having a slide, comprising: a connecting rod, means for adjusting the slide drive device, the adjusting means being effective to adjust a stroke of the slide, the adjusting means slidably affixed to the connecting rod, the connecting rod being effective to transfer a reciprocating motion to the adjusting means, the adjusting means being operable to guide the reciprocating motion along a specified trajectory, the adjusting means being pivotable about a center position to adjust the specified trajectory, the center position being one of a top and a bottom dead center position of the slide and the connecting rod, means for guiding the slide drive device, a connecting link operably connects the adjusting means to the guiding means, the guiding means being effective to convert the reciprocating motion to a guiding displacement, a drive branching link in the guiding means, a first and a second upper toggle means for transferring the guiding displacement to the slide, a rotation center on each the first and second upper toggle means, the rotation center permitting the first and second upper toggle means to rotate in an arc, the drive branching link being effective to transfer the guiding displacement to the one upper toggle means whereby the slide operates in an adjustable cycle, a first link having a first end connects each the rotation center to the drive branching link, the drive branching link effective to transfer the guiding displacement to each the first and second upper toggle link means along an common inner tangent line to each the arc between the first ends, a first and a second lower toggle link, a second link operably connects each the rotation center to each the respective lower toggle link, and the first and second upper toggle means operably transfer the guiding displacement through the second links to respective first and second lower toggle links and the slide whereby the slide operates through the cycle while maintaining a left and right balance.

The above, and other objects, features and advantages of the present invention will become apparent from the following description read in conjunction with the accompanying drawings, in which like reference numerals designate the same elements.

DESCRIPTION OF THE PREFERRED EMBODIMENTS

Figure 1:
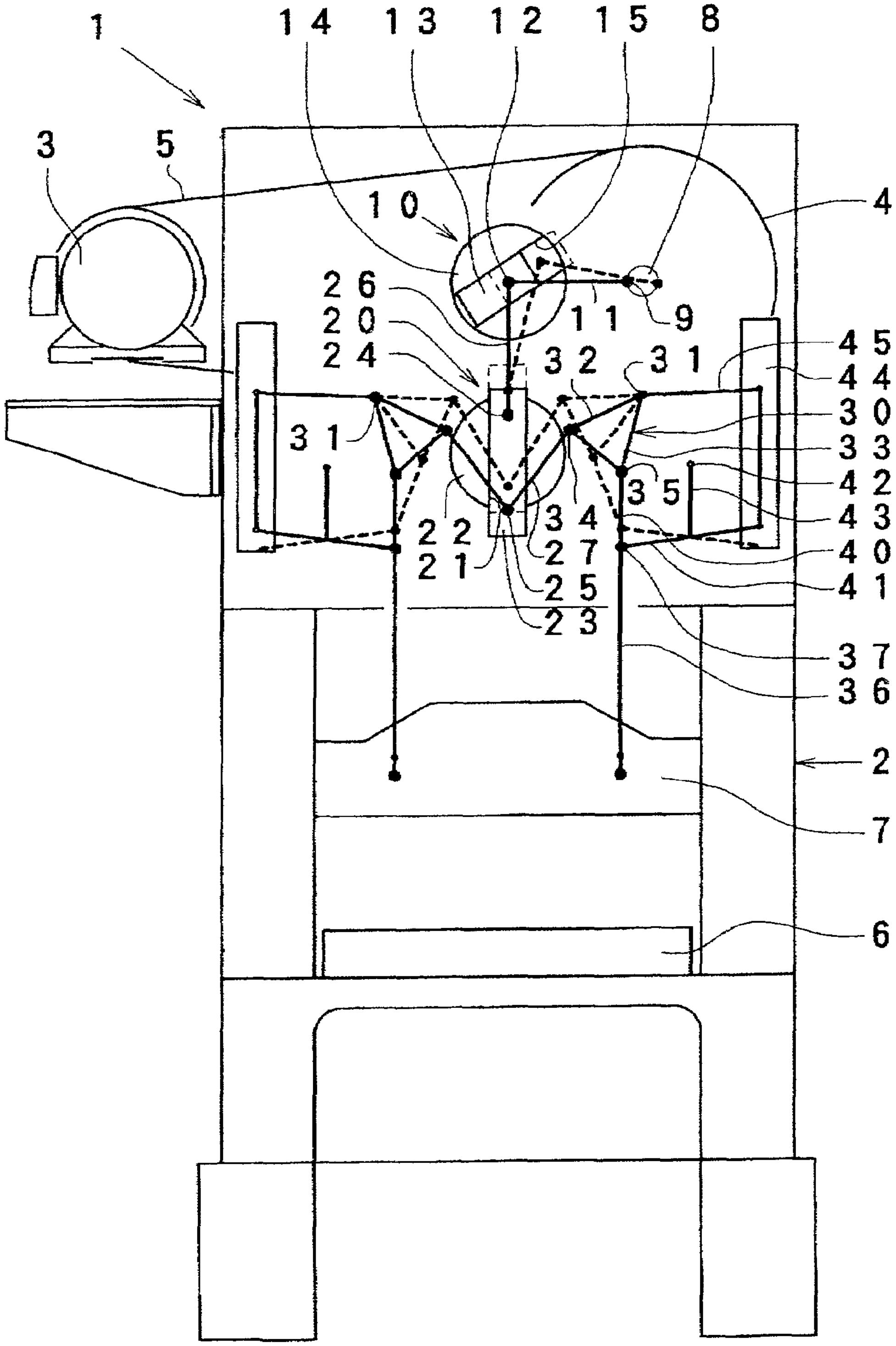
FIG. 1 is front view of a press according to a first embodiment.
Figure 2:
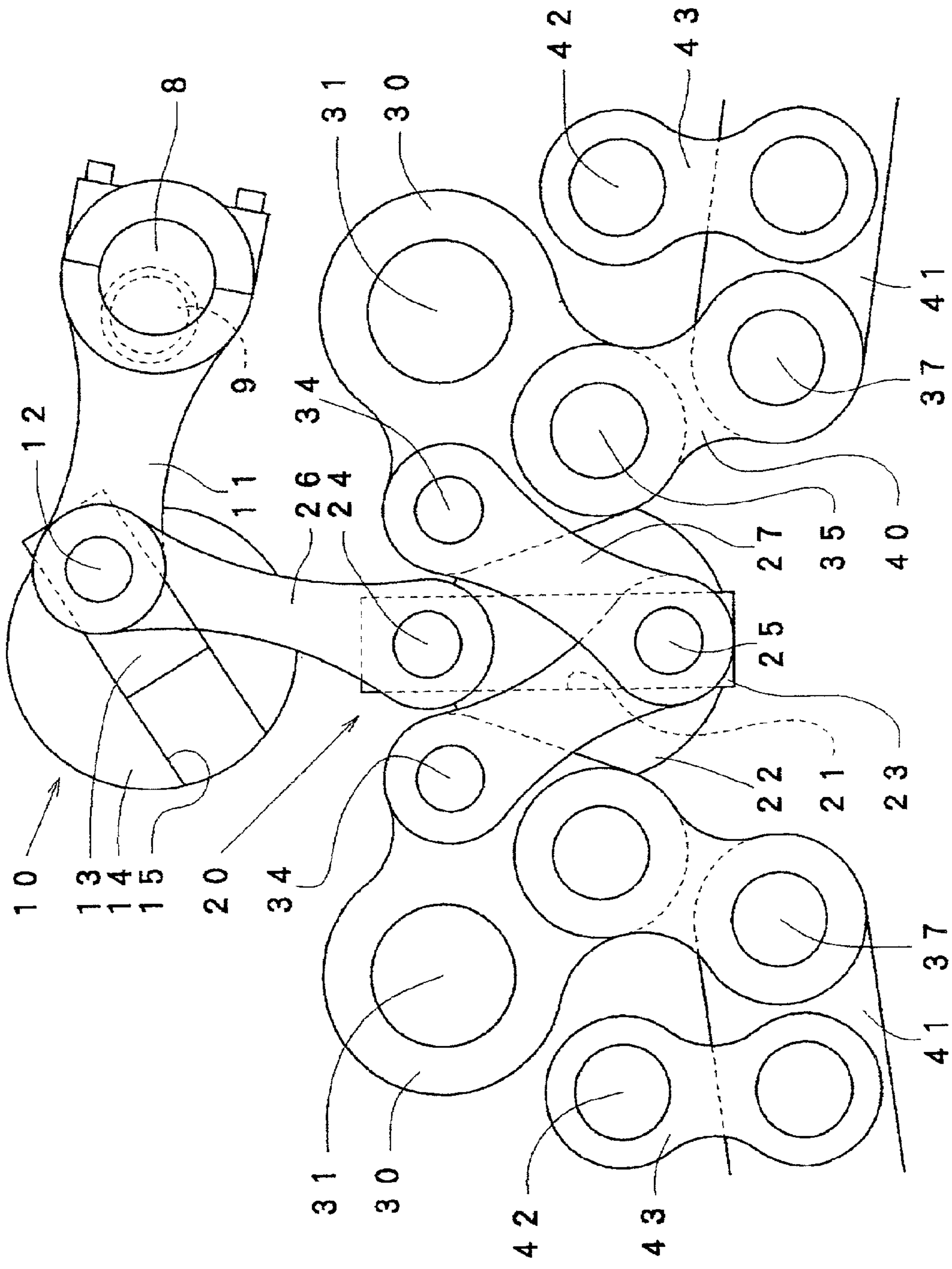
FIG. 2 is a descriptive view showing the links for the first embodiment.

Referring to FIGS. 1 and 2, a press 1 includes a frame 2. A main motor 3 on frame 2 and serves as a power source for press 1. Power from main motor 3 transfers through a belt 5 to a fly wheel 4. A bolster 6 is affixed to frame 2 below press 1.

A slide 7 is in frame 2. Slide 7 operates smoothly in frame 2 above bolster 6. An upper mold (not shown) is attached to slide 7. A lower mold (not shown) is attached to bolster 6. A pair of plungers 36 drive slide 7. During operation, the upper mold and lower mold are brought together to conduct pressing, as will be explained. During operation, slide 7 and plungers 36 are each guided by a guiding device (not shown).

A crank shaft 8 is rotatably affixed in frame 2. An eccentric part 9 is on crank shaft 8. Fly wheel 4 is connected to one end of crank shaft 8. A connecting rod 11 has a large end and a small end. The large end is connected to eccentric part 9. The small end is connected to a pin 12 of a slider 13.

A guide board 14 is retained on frame 2. Guide board 14 can be pivoted and adjusted on frame 2. Guide board 14 has a linear groove 15. Slider 13 is slidably inserted in linear groove 15. In operation, Slider 13 can slide linearly along linear groove 15, as will be explained.

Guide board 14 has a rotation center that is a bottom dead center position of the small end of connecting rod 11.

It is to be understood that in FIG. 1, the solid line represents press 1 at a bottom dead center position, and the dashed line represents press 1 at a top dead center position, as will be explained.

It is to be further understood that in FIG. 2, each of the links is shown when press 1 is at the top dead center position.

It is to be understood, that although no particular mechanism is provided for pivoting and maintaining guide board 14 at a desired angle, it is to be understood that mechanisms exist for such adjustment, for example a worm wheel on an arc section of guide board 14 pivoted by a worm.

An adjusting mechanism 10 is constructed from linear slider 13 and pivotable guide board 14.

A linear guide mechanism 20 is in a center of an upper part of frame 2. Linear guide mechanism 20 is directly below the bottom dead center position of the small end of connecting rod 11. Linear guide mechanism 20 is directly below the pivoting center of guide board 14.

Linear guide mechanism 20 includes a base 22 and a slider 23. Base 22 has a groove 21 in a vertical direction. Slider 23 is slidably inserted in groove 21.

Slider 23 has an upper support point pin 24 and a lower support point pin 25. A connecting link 26 rotatably connects upper support point pin 24 and pin 12 of slider 13.

It is to be understood, that in configurations where connecting link 26 does not interfere with other members of the slide drive device, the upper support point pin 24 and lower support point pin 25 may be alternatively combined into a single support point pin.

A pair of fixed support point pins 31, 31 are in the upper part of frame 2 of press 1. Fixed support point pins 31, 31 are at left and right symmetric position opposite a common center line.

A pair of upper toggle links 30, 30 are swingably mounted on support point pins 31, 31. Fixed support point pins 31, 31 serve as centers of oscillation for upper toggle links 30, 30.

Upper toggle links 30 is generally shaped as an isosceles triangle. A first link 32 extends from upper toggle links 30 and serves as a first side of the isosceles triangle. A second link 33 extends from upper toggle links 30 serves as a second side of the isosceles triangle.

A pair of first pins 34 are opposite fixed support point pins 31 on upper toggle links 30. First pins 34 are each on the other end of each first link 32. A pair of drive branching links 27 rotatably connects each first pin 34 to lower support point pin 25.

A pair of second pins 35 are opposite fixed support point pins 31 on upper toggle links 30. Second pins 35 are each on the other end of each second link 33. A connecting pin 37 is on an end of each plunger 36. Each plunger 36 is upright on slide 7. A lower toggle link 40 connects each second pin 35 with each connecting pin 37.

A pair of balancer links 41 each rotatably connect to connecting pins 37 at a first end. Each balancer link 41 also connects to the end of each plunger 36 at the first end.

A support link 43 supports a central part of each balance link 41. Support links 43 are each swingably mounted on a fixed support point 42 on frame 2.

A pair of retention links 45 are rotatably connected to a pair of dynamic balancers 44. The upper part of each dynamic balancer 44 connects to fixed support point pin 31 of upper toggle link 30 through retention link 45.

During operation crank shaft 8 rotates and connecting rod 11 oscillates. Slider 13, connected to the small end of connection rod 11 through pin 12 reciprocates along groove 15 of adjusting mechanism 10. Connecting link 26 converts this reciprocating motion to a substantially vertical reciprocating motion of slider 23 in linear guide mechanism 20. It is to be understood, that descriptive phrases vertical or horizontal or otherwise are used for convenience and are not required for operation in other orientations.

Slider 23 connects to each branching link 27 through lower support point pin 25. Each branching link 27 converts the vertical reciprocation of slider 23 into oscillation of each upper toggle link 30.

The oscillation of each upper toggle link 30 is transferred from first link 32 to second link 33 through fixed support point pin 31. Each lower toggle link 40 converts the oscillation of each upper toggle link 30 to each plunger 36. Each plunger 36 transfers motion to slide 7, and slide 7 operates. Simultaneously, each lower toggle link 40 transfers motion to each balancer link 41. Each balancer link 41 moves each balancer 44 moves vertically in the opposite direction of slide 7.

It is to be understood that in the slide drive device of the present configuration vibration is minimized and operational stresses are reduced.

Figure 3:
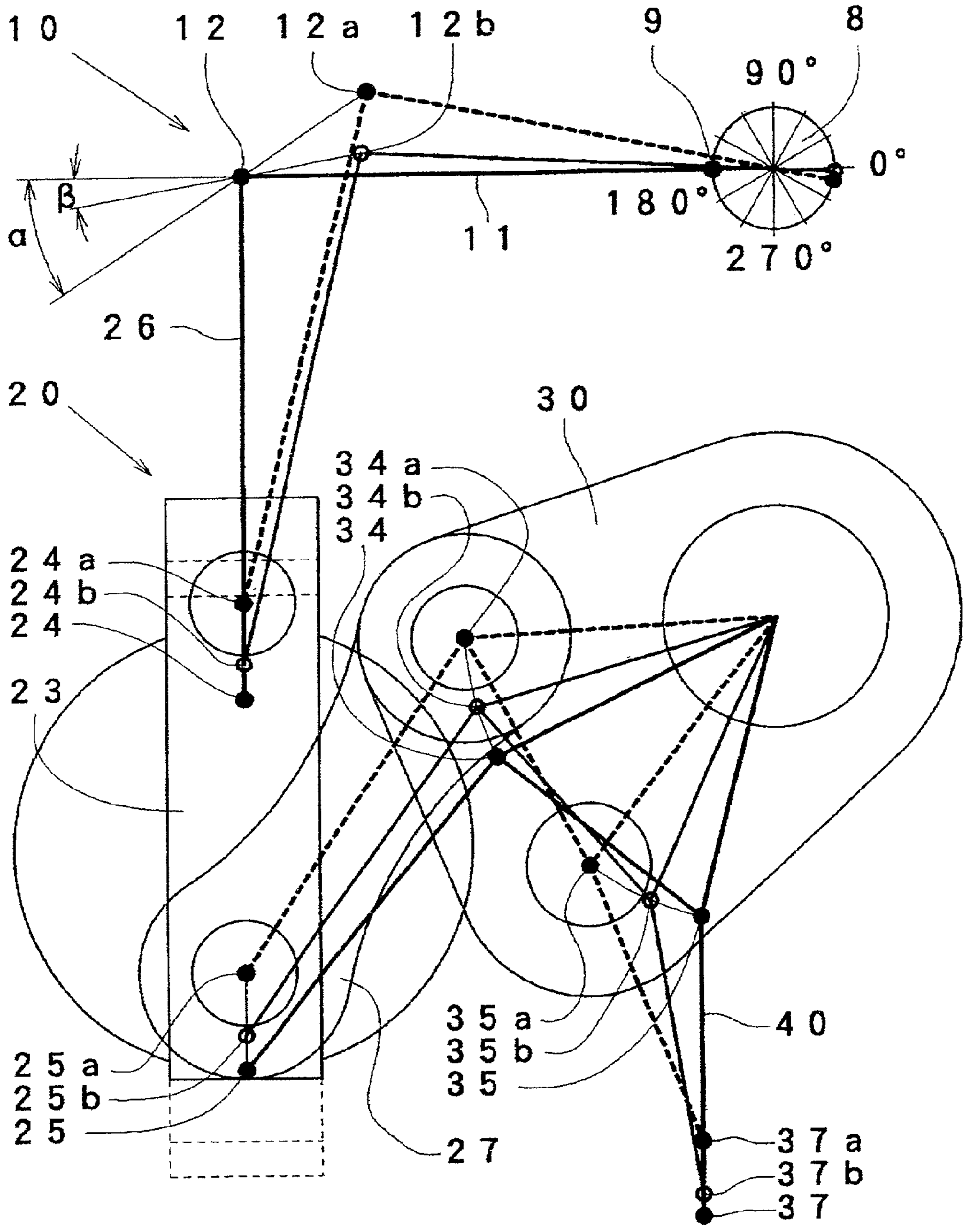
FIG. 3 is a descriptive view showing changes in the stroke for one part of the first embodiment.

Additionally referring now to FIG. 3, the drive mechanism for linear guide mechanisms 20 are symmetric to a center line (not shown) and only one side is shown for clarity.

A slope angle α (alpha) is defined between a horizontal line through the rotation center of guide board 14 of adjusting mechanism 10 and groove 15.

When groove 15 is at slope angle α, the reciprocating motion of slider 13 is fixed at slope angle α. During the reciprocating motion of slider 13 at slope angle α, the motion of slider 13 is between a position of pin 12 and a position 12*a*.

During adjustment, guide board 14 is pivoted and the slope angle of groove 15 becomes a slope angle β (beta). Slope angle β (beta) is defined between a horizontal line through the rotation center of guide board 14 and the now adjusted groove 15. When groove 15 is at slope angle β, the reciprocating motion of slider 13 is fixed at slope angle β. During the reciprocating motion of slider 13 at slope angle β, the motion of slider 13 is between a position of pin 12 and a position 12*b*.

It is to be understood, that guide board 14 has a center that is a bottom dead center position of the small end of connecting rod 11, or in other words the position of pin 12.

During operation, the length of connecting link 26 remains constant. During adjustment, the vertical reciprocating motion of slider 23 remains vertical. During reciprocating operation before adjustment, the position of upper support point pin 24 changes from a position of upper support point pin 24 to a position 24*a*. During operation after adjustment the position of upper support point pin 24 changes from a position of upper support point pin 24 to a position 24*b*.

Similarly, before adjustment, the reciprocating motion of lower support point pin 25 is between a position of lower support point pin 25 and a position 25*a*. After adjustment, the reciprocating motion of lower support point pin 25 is between a position of lower support point pin 25 and a position 25*b*.

Before adjustment, the oscillation range of first pin 34 is between a position of first pin 34 and a position 34*a*. After adjustment, the oscillation range of first pin 34 is between a position of first pin 34 and a position 34*b*.

Before adjustment, the oscillation range of second pin 35 is between a position of second pin 35 and a position 35*a*. After adjustment, the oscillation range of second pin 35 is between a position of second pin 35 and a position 35*b*.

Before adjustment, the reciprocating motion of connecting pin 37 is between a position of connection pin 37 and a position 37*a*. After adjustment, the reciprocating motion of connection pin 37 is between a position of connecting pin 37 and a position 37*b*.

As a result, without changing the position of the bottom dead center, the position of the top dead center changes the same amount as the change in the position of connecting pin 37. As a result, stroke of slide 7 is changed without changing the position of the bottom dead center.

Figure 4:
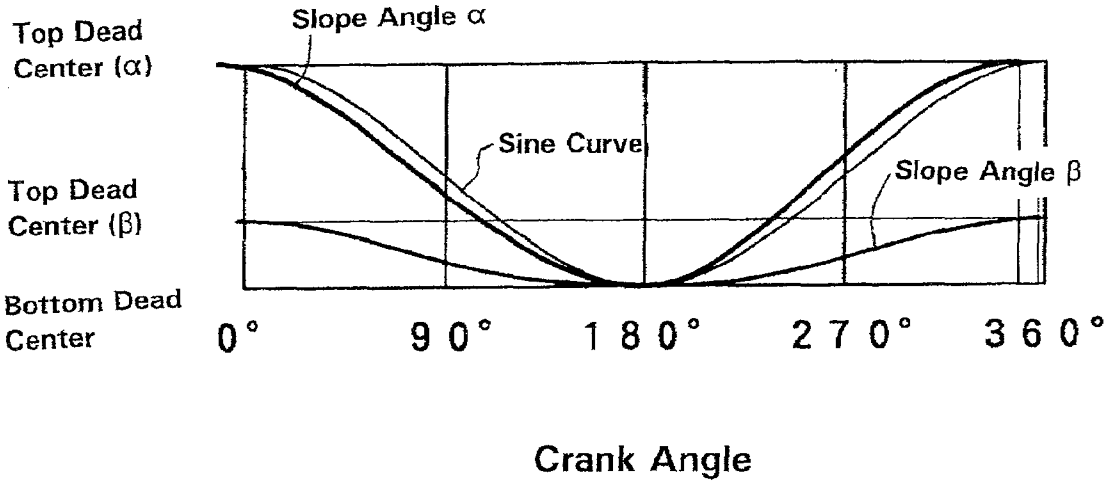
FIG. 4 is a figure showing the slide motion for the first embodiment.

Additionally referring now to FIG. 4, a motion of slide 7 is shown and compared to a sine curve. The motion of slider 13 at slope angle α is shown. The motion of slider 13 at slope angle β is also shown. The crank angle at the bottom dead center position is 180 degrees.

As an example, when slope angle α is 32 degrees 40', the crank angle at the top dead center position is 348 degrees

30', and the slide stroke is 50 mm. When the slope angle β is 10 degrees 30', the crank angle at the top dead center is 357 degrees, and the slide stroke is 15 mm.

As is shown, by changing the slope angle of groove 15, the slide stroke can be change while maintaining a constant bottom dead center position. As is also shown, even when the slide stroke is changed the left-to-right balance of the slide drive device does not change. Although the change in the slope angle causes a slight change at the top dead center position between slope angle α and slope angle β, this is not a concern in practice.

Figure 5:
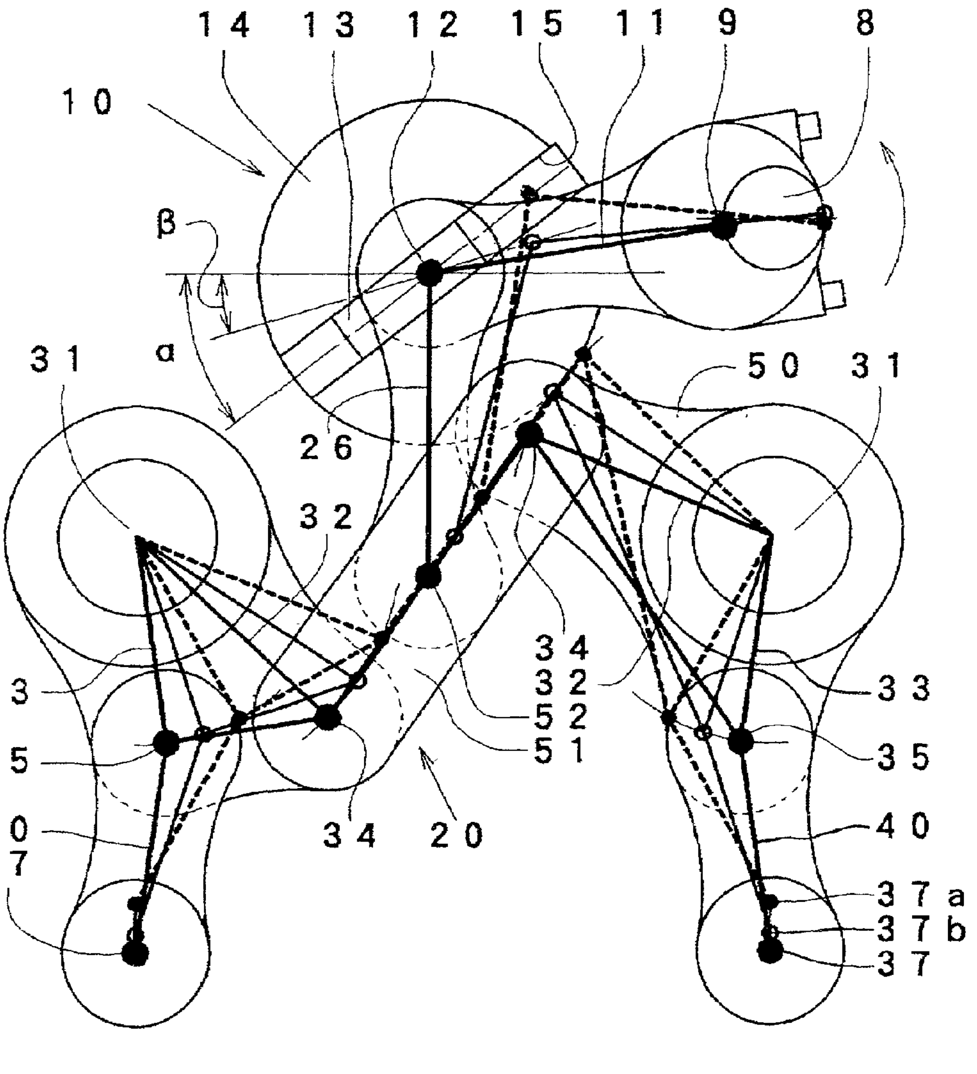
FIG. 5 is a descriptive view of the slide drive device representing a second embodiment of the present invention.

Additionally referring now to FIG. 5. showing a second configuration of the present invention. In this embodiment, linear guide mechanism 20 of the first embodiment is changed.

The small end of connecting rod 11 is at the bottom dead center position. The position of each link is represented by a thick solid line. The position of each pin is represented by a large black dot.

When the small end of connecting rod 11 is at the top dead center position, the position each link is represented by a thick dashed line with small black dots for the positions of the pins.

Where the slope angle is β the small end of connecting rod 11 is at the top dead center position, each link is represented by a thin solid line with small circles for the positions of the pins.

A pair of upper toggle links 50 are pivotably mounted on each left and right fixed support point pin 31. Upper toggle links 50 are similarly positioned as were upper toggle links 30 in the first embodiment.

A first link 32 is on each upper toggle link 50. First links 32 extend toward the center of linear guide mechanism 20. First links 32 are of equal lengths. First links 32 extend from fixed support point pins 31 to first pins 34.

A second link 33 is on each upper toggle link 50. Second links 33 extend below adjusting mechanism 10. Second links 33 are of equal lengths. Second links extend from first support point pins 31 to second pins 35.

During operation, upper toggle links 50, first links 32, and second links 33 operate in are-shaped trajectories. The arc-shaped trajectories have first support pins 31 as a rotation center. During operation, each arc-shaped trajectory has a common inner tangent between two tangent points.

A drive branching link 51 connects left and right first pins 34 at a pitch of the distance between the two inner tangent points. It is to be understood, that the two tangent points are common to each arc-shaped trajectory where the left and right first links 32 are parallel to each other. It is to be understood, that the second links 33 are at symmetric positions relative to a common center line between fixed support point pins 31.

A central support point pin 52 is at the midpoint of drive branching link 51. Central support point pin 52 connects connecting link 26 to pin 12.

In the second embodiment, linear guide mechanism 20 extends between left and right upper toggle links 50. Linear guide mechanism 20 includes drive branching link 51 and central support pin 52.

First links 32, second links 33, upper toggle links 50, and drive branching link 51 form a type of Watt link mechanism and parallelism between related components is easily maintained.

During operation, drive branching link 51 has an approximately linear motion along the above-described common inner tangent line. Through the operation of linear guide mechanism 20, the oscillation of connecting rod 11 and connecting link 26 are converted into substantially linear motion and transferred to each upper toggle link 50. This conversion from oscillation to substantially linear motion reduces vibration and increases adjustment precision.

During adjustment, when a slope angle is adjusted slide 7 may be moved with great precision while maintaining the left-right balance of the slide device. It is to be understood, that maintaining precision adjustment of a slide and maintaining left-right balance is desirable for manufacturers to increase efficiency.

Figure 6:
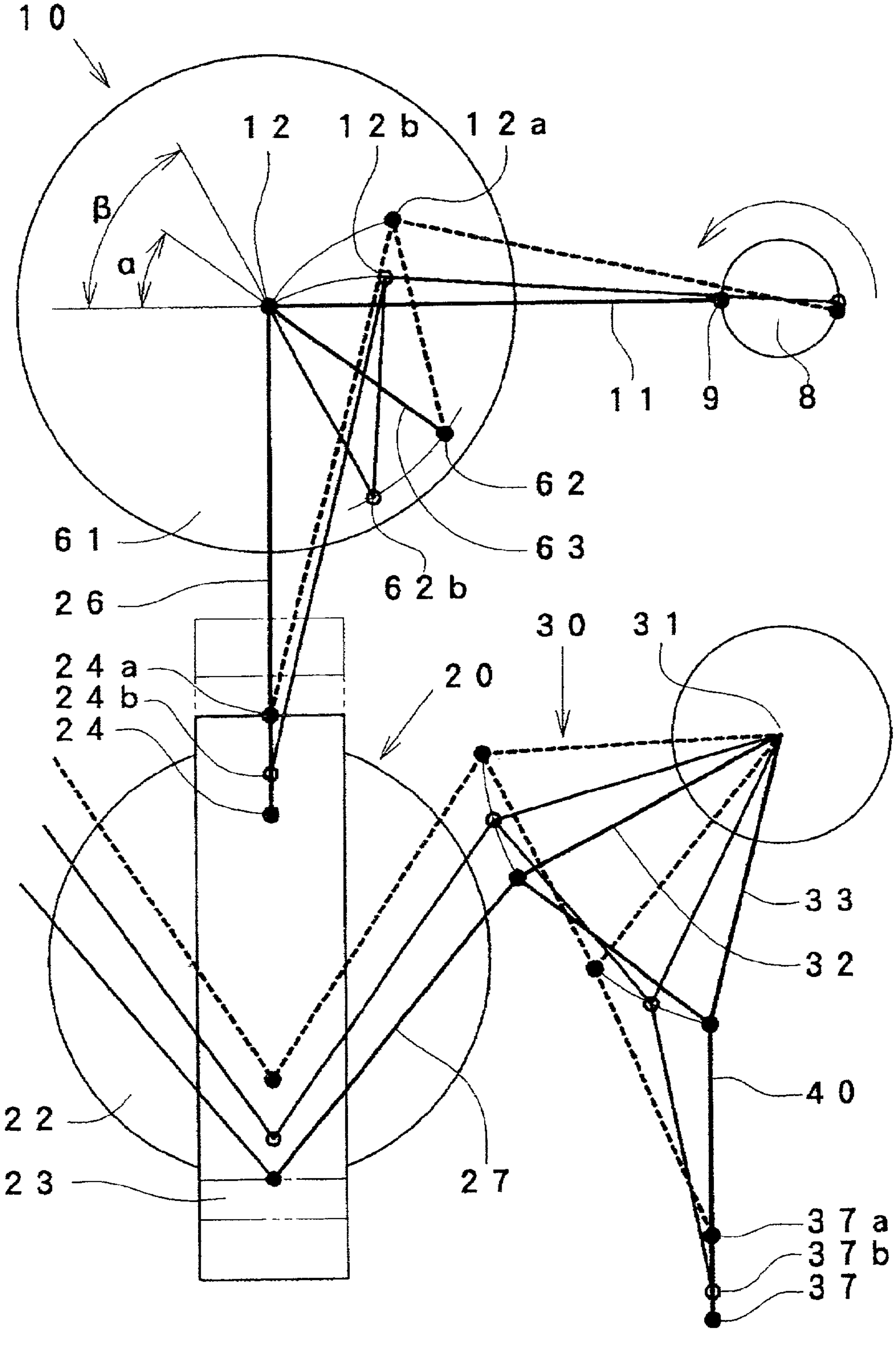
FIG. 6 is a descriptive view of the slide drive device representing a third embodiment of the present invention.

Additionally referring now to FIG. 6, describing a third embodiment of the slide drive device according to the present invention. In this embodiment, slope angle α is defined with respect to the horizontal. In this embodiment, only adjusting mechanism 10 of the first embodiment is changed.

When the small end of connecting rod 11 is at the bottom dead center position, each of the respective links is represented by a thick solid line, and each respective pin by a solid black dot.

When the small end of connecting rod 11 is at the top dead center position, each of the respective links is represented by a dashed line, and each respective pin by a solid black dot.

When the slope angle is slope angle β, the small end of connecting rod 11 is at the top dead center position and each of respective link is represented by a thin solid line with the positions of the pins as small circles.

A trajectory center pin 62 is on a guide board 61. Guide board 61 is pivotable around a center of the bottom dead center position of the small end of connecting rod 11.

A trajectory forming link 63 operably connect trajectory center pin 62 to pin 12. Pin 12 is at the small end of connecting rod 11. Connecting link 26 operably connects pin 12 to upper support point pin 24 of linear guide mechanism 20. Adjusting mechanism 10 of the third embodiment thus includes at least pin 12, trajectory center pin 62, trajectory forming link 63, guide board 61 and connecting link 26.

During operation, crank shaft 8 rotates and the small end of connecting rod 11 reciprocates. The small end of connecting rod 11 reciprocates from the bottom dead center position of pin 12 to top dead center position 12*a* of pin 12. Due to the combined action of guide board 61, trajectory center pin 62, and trajectory forming link 62, small end of connecting rod 11 has an arc-shaped trajectory between the position of pin 12 and position 12*a*.

Connecting link 26 transfers the reciprocating motion of connecting rod 11 to slider 23. Upper support point pin 24 on slider 23 linearly reciprocates between the position of upper support point pin 24 and a position 24*a* at the end of each stroke cycle.

During adjustment, guide board 61 is pivoted and the position of trajectory center pin 62 is moved to a position 26*b*. During operation after adjustment, the small end of connecting rod 11 reciprocates through an arc-shaped trajectory from the bottom dead center position of pin 12 and to top dead center position 12*b* of pin 12.

During operation after adjustment, slider 23 of linear guide mechanism 20 vertically reciprocates between the bottom position of upper support point pin 24 and upper position 24*b*.

During operation before adjustment, the substantially linear motion of connecting pin 37 is between the position of connecting pin 37 and position 37*a*. During operation after adjustment, the substantially linear motion of connecting pin 37 is between the position of connecting pin 37 and position 37*b*.

Since connection pins 37 connect each through plungers 36 to slide 7, the top dead center position of slide 7 can be changed without changing the position of the bottom dead center.

It is to be understood, that changes in the slide stroke of slide 7 may be conducted in various manners according to manufacturer demand or customer need. For example changes in the slide stroke may be conduced by combining adjustment mechanism 10 of this third embodiment with linear guide mechanism 20 of the second embodiment (described above). For another example, changes in the slide stroke and operational efficiency of slide drive device 1 of the third embodiment may be accomplished through combination with the equipment for dynamic balancer 44 of the first embodiment. In each example, the top dead center position may be adjusted without changing the bottom dead center position.

Figure 7:
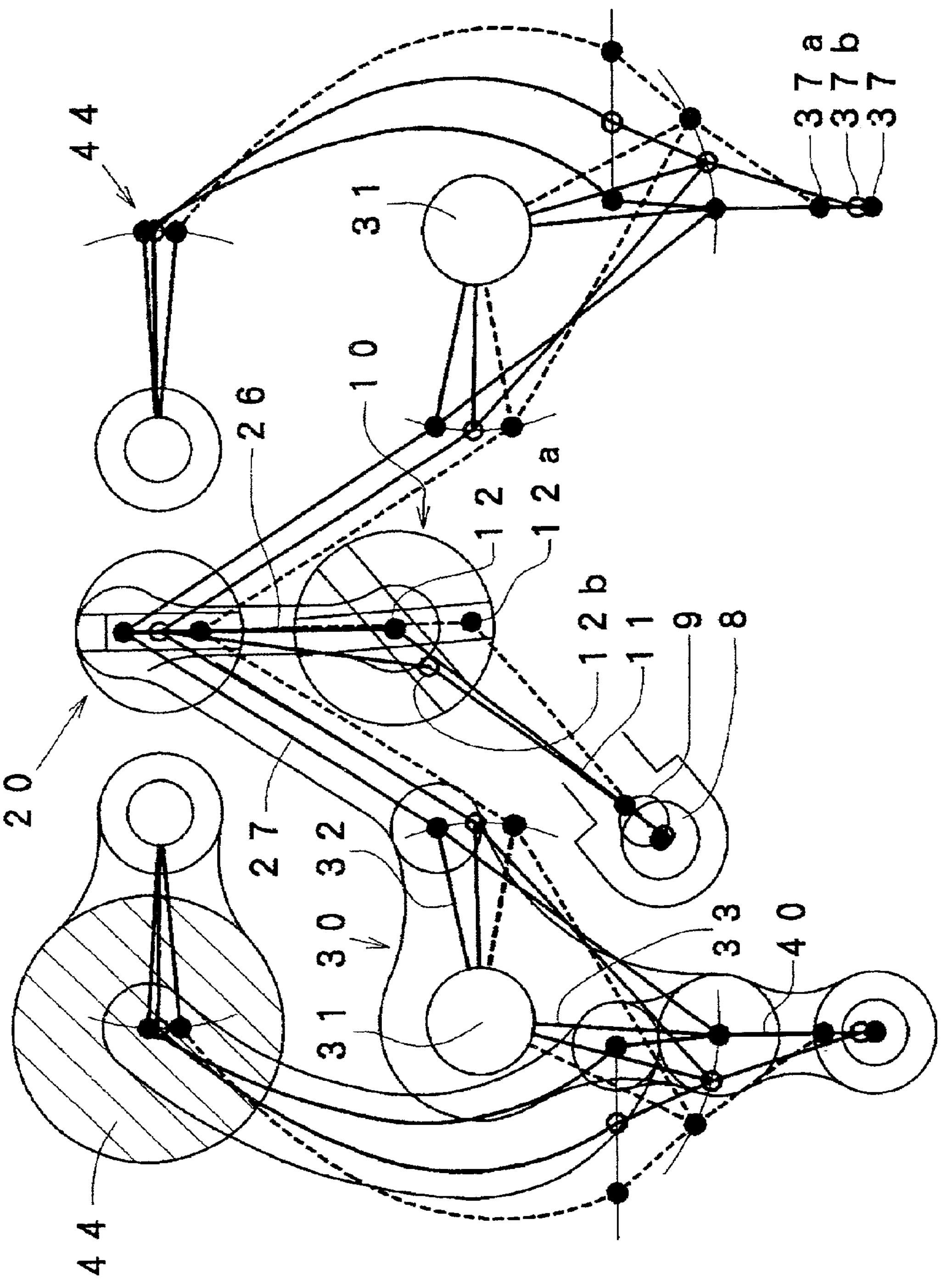
FIG. 7 is a descriptive view of the slide drive device representing a fourth embodiment of the present invention.

Additionally referring now to FIG. 7, where a fourth embodiment of the present invention places adjusting mechanism 10 below linear guide mechanism 20. The fourth embodiment operates in a substantially similar manner to the first embodiment. The thick, thin, and dashed lines and corresponding pin indicators are the same as above to designate operation before and after adjustment.

Drive shaft 8 with eccentric part 9 are placed below upper toggle links 30. Drive shaft 8 with eccentric part 9 are also below adjusting mechanism 10 and linear guide mechanism 20. Adjusting mechanism 10 is below linear guide mechanism 20.

Dynamic balancers 44 are positioned outward from fixed support point pins 31 and upper toggle links 30. Dynamic balancers 44 operate in an arc-trajectory around a fixed support pin (shown but not described) and act to minimize operational vibration and equipment wear. Dynamic balancers 44 connect to upper toggle links 30 through arc-shaped links and extensions (both shown but not described).

Figure 8:
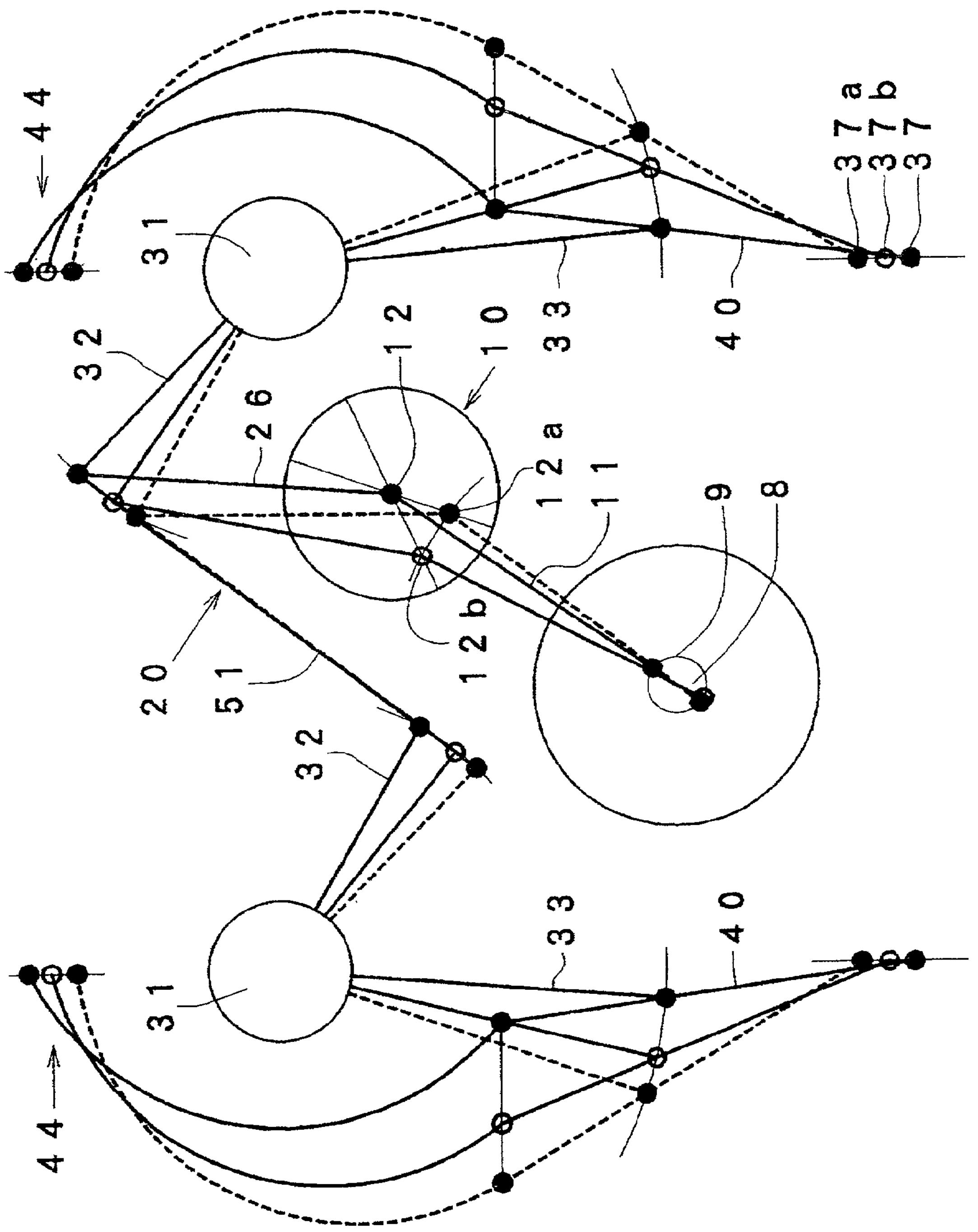
FIG. 8 is a descriptive view of the slide drive device representing a fifth embodiment of the present invention.

Additionally referring now to FIG. 8 describing the fifth embodiment of the present invention. In this embodiment, crank shaft 8 is placed below adjusting mechanism 10. Adjusting mechanism 10 is placed below linear guide mechanism 20.

Connecting link 26 rotatively extends from pin 12 to one end of drive branching link 51 at one of first pins 34. First pins 34 are at both ends of drive branching link 51 and connect to first links 32.

The assembly of the fifth through seventh embodiment is different from the second embodiment of FIG. 5, where connecting link 26 extended from pin 12 to central support point pin 52 of drive branching link 51.

It is to be understood, that the present invention may be implemented by connecting connecting link 26 with any position along drive branching link 51.

Figure 9:
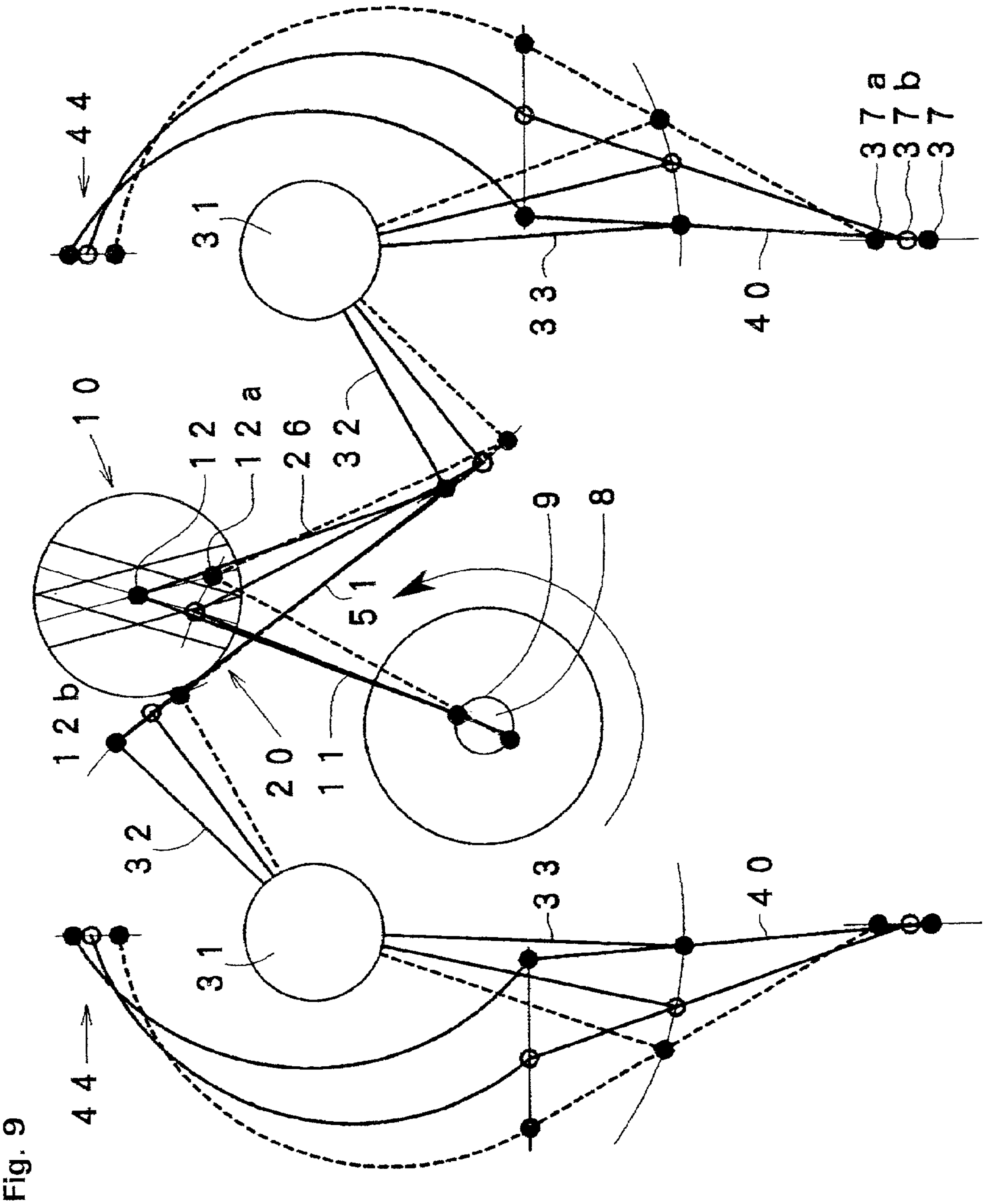
FIG. 9 is a descriptive view of the slide drive device representing a sixth embodiment of the present invention.

Additionally referring now to FIG. 9, describing the sixth embodiment of the present invention. In this embodiment, crank shaft 8 is placed below adjusting mechanism 10. Adjusting mechanism 10 is placed above linear guide mechanism 20.

Figure 10:
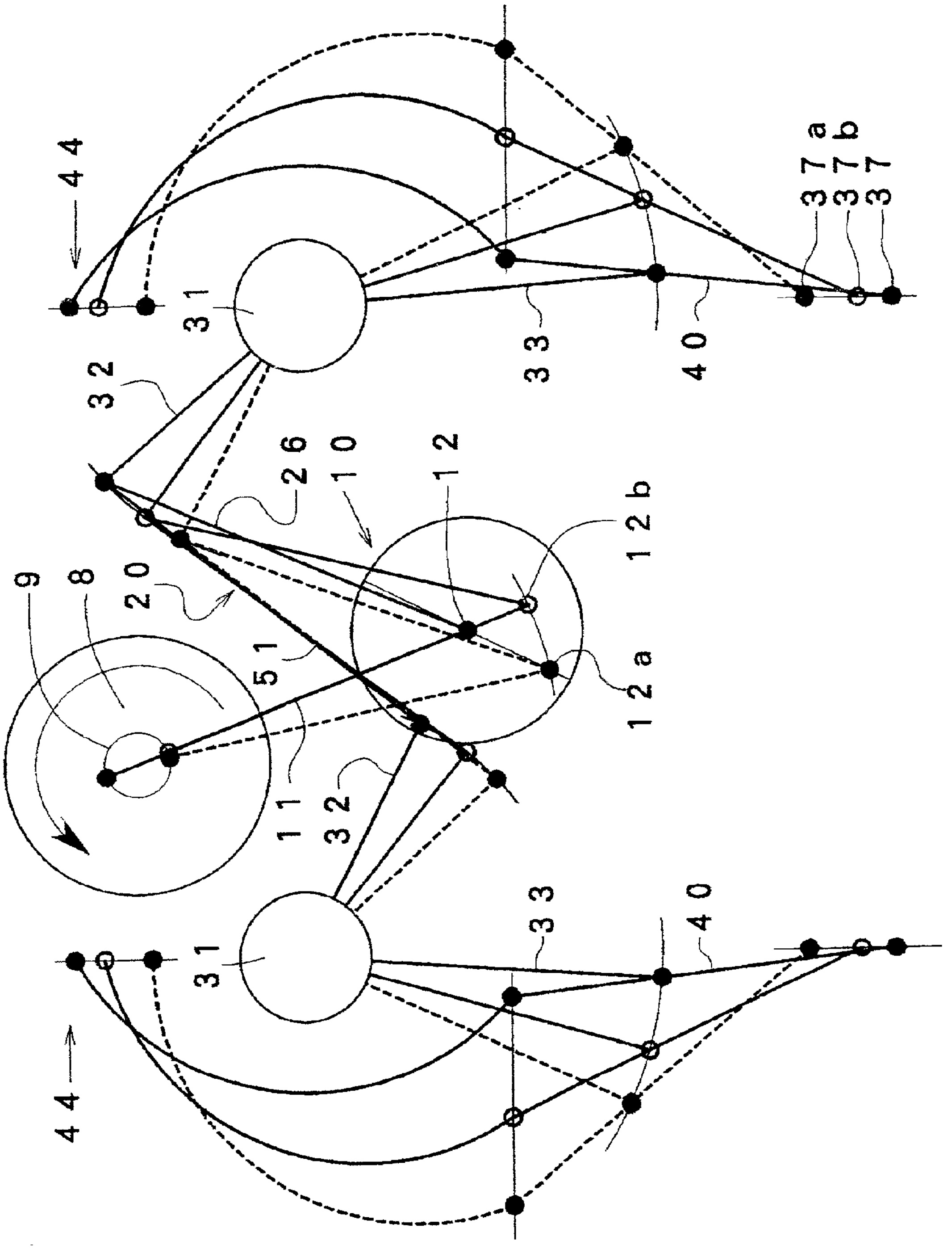
FIG. 10 is a descriptive view of the slide drive device representing a seventh embodiment of the present invention.

Additionally referring now to FIG. 10, describing the seventh embodiment of the present invention. In this embodiment, crank shaft 8 is placed above adjusting mechanism 10 and linear guide mechanism 20. Adjusting mechanism 10 is below linear guide mechanism 20.

It is to be further understood, that in each embodiment above, the bottom dead center position of the small end of connecting rod 11 is fixed and the top dead center position is adjustable. Through adjusting the top dead center position of the small end of connecting rod 11, the top dead center position of slide 7 may be adjusted without changing the bottom dead center position of slide 7. As a result, according to each embodiment of the present invention the slide stroke of slide 7 may be easily adjusted without changing the bottom dead center position.

It is to be further understood, that in each embodiment of the present invention, it is possible to fix one of either the top or bottom dead center position of slide 7 and adjust the slide position relative to the fixed top or bottom center position according to customer or manufacturer desire. It is to be understood that this adaptation is possible through easy reconfiguration of adjusting mechanism, 10, linear guide mechanism 20, and the other components in press 1.

Since the slide drive device of the present invention is a mechanical device, by adjusting the angle of first links 32 and second links 33 of upper toggle links 30, 50, the top dead center position of the small end of connecting rod 11 may be fixed and the bottom dead center adjusted adjustable. As a result, the stroke of slide 7 may be fixed at a top dead center position and the bottom dead center position adjustable.

It is to be understood, that since the present invention allows slide stroke adjustment to occur before the left and right drive branching.

It is to be understood, that since slide stroke adjustment occurs before the left and right branching, the left and right balance will remain despite any adjustment.

It is to be understood, that since slide stroke adjustment occurs before the left and right drive branching, adjustment of the slide stroke is not substantially related to the overall precision of the press, since either the top or bottom dead center position is fixed and the other adjustable.

It should be also understood, that since the adjustment occurs through guide boards 14 or 61 and the other links and pins of the present invention, precise adjustment of the slide stroke can be made easily.

It is to be understood, that the motion of the small end of connecting rod 11 is converted with high precision to a reciprocating motion along a linear trajectory in guide boards 14, 61, where pin 12 has a linear motion relative to press 1.

It is to be further understood, that since guide boards 14, 61 may be rotated with precision to change the slope of the trajectory, the slide drive device may be adjusted with high precision and a simple mechanism.

It is to be understood, that the motion and the motion of pin 12 may be guided in an arc-shaped motion, relative to press 1, by trajectory forming link 63 and trajectory center pin 62 thereby minimizing mechanical stress.

It is to be understood, that where the motion of pin 12 to press 1 is either linear or arc-shaped, the slope of the trajectory can be changed by pivoting guide boards 14, 61 to a desired angle.

It is to be understood that linear guide mechanism 20 may provide reciprocating motion along a vertical linear line or along an inclined linear line depending upon the embodiment. In either case, the left and right balance is maintained with efficiency and precision and equipment life is maintained.

It is to be understood that where linear guide mechanism 20 provides reciprocating motion along a vertical linear line, the first, third or fourth embodiments using slider 23 and base 22 are employed.

It is to be understood that where linear guide mechanism 20 provides reciprocating motion along an inclined linear line, the second, fifth, sixth or seventh embodiments employ drive branching links 27, 51 to simplify the device and maintain precision.

Although only a single or few exemplary embodiments of this invention have been described in detail above, those skilled in the art will readily appreciate that many modifications are possible in the exemplary embodiment(s) without materially departing from the novel teachings and advantages of this invention. Accordingly, all such modifications are intended to be included within the scope of this invention as defined in the following claims. In the claims, means-plus-function clauses are intended to cover the structures described or suggested herein as performing the recited function and not only structural equivalents but also equivalent structures. Thus although a nail and screw may not be structural equivalents in that a nail relies entirely on friction between a wooden part and a cylindrical surface whereas a screw's helical surface positively engages the wooden part, in the environment of fastening wooden parts, a nail and a screw may be equivalent structures.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. A slide drive device for a press machine having a slide, comprising:

adjusting means for adjusting said slide drive device;

said adjusting means to adjust a stroke of said slide and being pivotable about a center position to adjust said stroke;

said center position being one of a top and a bottom dead center position of said slide;

said adjusting means provided to receive a reciprocating motion;

a connecting link coupled to said adjusting means;

guiding means for guiding said slide drive device coupled to said connecting link;

said connecting link being effective to transfer said reciprocating motion to said guiding means;

said guiding means being effective to convert said reciprocating motion to a linearly guided displacement motion;

first and second drive branching links separately coupled to said guiding means;

first and second toggle means coupled respectively to the first and second drive branching links, and said first and second toggle means coupled separately to the slide;

wherein the first and second drive branching links respectively converts the linearly guided displacement motion to a toggling motion of the first and second toggle means, and the first and second toggle means transfer the toggling motion to a linear cyclic motion of the slide.

2. A slide drive device, according to claim 1, wherein:

said adjusting means being a single, shared adjusting means on which the motion of each of said at least one drive branching link is dependent.

3. A slide drive device, according to claim 1, further comprising:

said first and said second upper toggle means;

a rotation center in each said first and second upper toggle means;

said rotation center permitting said first and second upper toggle means to rotate in an arc;

a first link connects each said rotation center to said at least one drive branching link;

said at least one drive branching link effective to transfer said guiding displacement to each said first and second upper toggle link means;

a first and a second lower toggle link;

a second link operably connects each said rotation center to each respective said lower toggle link; and said first and second upper toggle means being effective to transfer said guiding displacement through said second links to respective said first and second lower toggle links and said slide whereby said slide operates through said cycle while maintaining a left and right balance.

4. A slide drive device according to claim 1, further comprising:

a first and second dynamic balancer means;

a first and second retention link;

said first and second retention links operably connecting each respective said upper toggle means to each respective said dynamic balancer means; and each said first and second dynamic balancer means and said first and second retention links having a shape and a weight adaptable to each respective said first and second upper toggle link and said slide whereby vibration is minimized when said first and second upper toggle means drive said slide in said cycle.

5. A slide drive device, according to claim 1, wherein said crank shaft and said adjusting means are above said first and second upper toggle means and said at least one drive branching link.

6. A slide drive device according to claim 1, further comprising:

a base in said guiding means;

a groove in said base;

said groove being along a centerline between each said upper toggle means;

a slider being slidable in said groove;

said connecting link operably connected to said slider;

said connecting link transferring said reciprocating motion to said slider whereby said slider operates along said centerline;

said at least one drive branching link operably connected to said slider; and said at least one drive branching link and said slider transferring said guiding displacement to said first and second upper toggle means whereby said slide operates through said cycle while maintaining a left and right balance along said centerline.

7. A slide drive device, according to claim 1, wherein said means for adjusting said slide drive device comprises a guide board with a slider that slides linearly while receiving said reciprocating motion.

8. A slide drive device,according to claim 1, further comprising:

a connecting rod;

said connecting rod slidably guided by said adjusting means;

a crank shaft;

an eccentric part on said crank shaft;

said eccentric part having said reciprocating motion;

said connecting rod operably connects said eccentric part to said adjusting means; and said connecting rod being effective to transfer said reciprocating motion to said adjusting means whereby said slide operates through said cycle.

9. A slide drive device, according to claim 8, further comprising:

a guide board in said adjusting means;
a groove in said guide board;
a slider being slidable in said groove;
a pin extending from said slider;
said groove and said pin being pivotable about said center position;
one end of a first and second end of said connecting rod;
said one end operably fixed to said pin; and
said slider and said pin being effective to transfer said reciprocating motion to said connecting link and said guiding means.

10. A slide drive device, according to claim 8, wherein:
said adjusting means is operably affixed to said connecting rod;
said adjusting means is operable to guide said connecting rod along a specified trajectory; and
said adjusting means is pivotable about said center position to adjust said specified trajectory whereby said stroke is adjusted.

11. A slide drive device, according to claim 10, further comprising:
a first and a second upper toggle means;
a rotation center in each said first and second upper toggle means;
said rotation center permitting said first and second upper toggle means to rotate in an arc;
a first link connects each said rotation center to said at least one drive branching link;
said at least one drive branching link effective to transfer said guiding displacement to each said first and second upper toggle link means;
a first and a second lower toggle link;
a second link operably connects each said rotation center to each respective said lower toggle link; and
said first and second upper toggle means being effective to transfer said guiding displacement through said second links to respective said first and second lower toggle links and said slide whereby said slide operates through said cycle while maintaining a left and right balance.

12. A slide drive device, according to claim 11, further comprising:
a guide board in said adjusting means;
a groove in said guide board;
a slider being slidable in said groove;
a pin extending from said slider;
said groove and said pin being pivotable about said center position;
one end of a first and second end of said connecting rod;
said one end operably fixed to said pin; and
said slider and said pin being effective to transfer said reciprocating motion to said connecting link and said guiding means.

13. A slide drive device according to claim 12, further comprising:
a base in said guiding means;
a groove in said base;
said groove being along a centerline between each said upper toggle means;
a slider being slidable in said groove;
said connecting link operably connected to said slider;
said connecting link transferring said reciprocating motion to said slider whereby said slider operates along said centerline;
said at least one drive branching link operably connected to said slider; and
said at least one drive branching link and said slider transferring said guiding displacement to said first and second upper toggle means whereby said slide operates through said cycle while maintaining a left and right balance along said centerline.

14. A slide drive device according to claim 13, further comprising;
a trajectory pin;
a trajectory forming link;
said trajectory pin in said adjusting means;
said trajectory pin opposite said center position on said guide board;
said trajectory forming link operably connecting said trajectory pin to said one end of said connecting rod; and
said trajectory pin, said trajectory forming link, and said adjusting means being effective to convert said reciprocating motion of said one end to an arc-shaped trajectory.

15. A slide drive device according to claim 12, wherein:
said adjusting means is operable at a position equidistant between said first and second upper toggle means;
said crank shaft and said eccentric part is below said adjusting means; and
said guide means is above said adjusting means opposite said crank shaft.

16. A slide drive device according to claim 13, further comprising:
a first and second dynamic balancer means;
a first and second retention link;
said first and second retention links operably connecting each respective said upper toggle means to each respective said dynamic balancer means; and
each said first and second dynamic balancer means and said first and second retention links having a shape and a weight adaptable to each respective said first and second upper toggle link and said slide whereby vibration is minimized when said first and second upper toggle means drive said slide in said cycle.

17. A slide drive device, according to claim 12, further comprising:
a first pin in each said first and second upper toggle means;
said first links connects said first pins to each respective said rotation center on each said first and second upper toggle means; and
said at least one drive branching link operably connecting said first and second upper toggle means at said first pins on a common inner tangent line to each said arc.

18. A slide drive device, according to claim 17, further comprising:
a first and second end on said at least one drive branching link;
said first and second ends operably at said first pins on said first and second upper toggle means;
a connection position on said drive branching link between said first and second ends; and
said connecting link operably connecting to said drive branching link at said connection position along said drive branching link.

19. A slide drive device, according to claim 18, further comprising:
a first and second dynamic balancer means;
a first and second retention link;
said first and second retention links operably connecting each respective said upper toggle means to each respective said dynamic balancer means; and each said first and second dynamic balancer means and said first and second retention links having a shape and a weight adaptable to each respective said first and second upper toggle link and said slide whereby vibration is minimized when said first and second upper toggle means drive said slide in said cycle.

20. A slide drive device; according to claim 19, further comprising:

said connecting link operably connects to said drive branching link at said connection position;

said connection position being equidistant said first and second ends; and said drive shaft and said adjusting means are above said first and second upper toggle means and said drive branching link.

21. A slide drive device, according to claim 19, further comprising:

said connecting link operably connects to said drive branching link at one of said first and second ends; and said drive shaft and said adjusting means are below said first and second upper toggle means and said drive branching link.

22. A slide drive device, according to claim 19, further comprising:

said connecting link operably connects to said drive branching link at one of said first and second ends;

said drive shaft is below said first and second upper toggle means;

said adjusting means is above said first and second upper toggle means opposite said drive shaft; and said guiding means is between said drive shaft and said adjusting means.

23. A slide drive device, according to claim 19, further comprising:

said connecting link operably connects to said drive branching link at one of said first and second ends;

said drive shaft above said first and second upper toggle means;

said adjusting means below said first and second upper toggle means opposite said drive shaft; and said guiding means is between said drive shaft and said adjusting means.

24. A slide drive device for a press machine having a slide, comprising:

adjusting means, for adjusting said slide drive device, having a top and a bottom dead center positions;

said adjusting means permitting an adjustment of said slide without changing said one dead center position;

said adjustment of said slide changing said other dead center position of said slide;

said adjusting means being pivotable to a specified angle to adjust a stroke of said slide; and said adjusting means transferring a sliding, reciprocating motion to said slide.

25. A slide drive device according to claim 24, wherein:

said adjusting means is a single, shared adjusting means on which the motion of each of at least one drive branching link is dependent.

26. A slide drive device, according to claim 24, wherein said means for adjusting said slide drive device comprises a guide board with a slider that slides linearly while transferring said sliding, reciprocating motion to said slide.

27. A slide drive device, according to claim 24, further comprising:

guiding means for guiding said slide drive device;

first and second toggle means separately coupled to said guiding means;

said first and second toggle means driving said slide in a cycle; and said guiding means being effective to transmit said adjustment of said slide to said first and second toggle means whereby said stroke is adjusted without changing said other dead center position.

28. A slide drive device according to claim 27, further comprising:

a first and second dynamic balancer means;

a first and second retention link;

said first and second retention links operably connecting each respective said upper toggle means to each respective said dynamic balancer means; and each said first and second dynamic balancer means and said first and second retention links having a shape and a weight adaptable to each respective said first and second upper toggle link and said slide whereby vibration is minimized when said first and second upper toggle means drive said slide in said cycle.

29. A slide drive device, according to claim 27, further comprising:

a center position on said adjusting means;

said center position being proximate said one dead center position;

said adjusting means being operable about said center position to effect said adjustment of said slide.

30. A slide drive device, according to claim 29, further comprising:

a connecting rod coupled to said adjusting means;

said connecting rod receiving a reciprocating motion and transmitting said reciprocating motion to said adjusting means;

a connecting link coupled to said adjusting means;

said connecting link being effective to transmit said reciprocating motion from said adjusting means to said guiding means; and said guiding means being effective to convert said reciprocating motion to a guiding displacement, whereby said slide operates in said cycle.

31. A slide drive device, according to claim 30, further comprising:

a guide board in said adjusting means;

a groove in said guide board;

a slider being slidable in said groove;

a pin extending from said slider;

said groove and said pin being pivotable about said center position;

one end of a first and second end of said connecting rod;

said one end operably fixed to said pin; and said slider and said pin being effective to transfer said reciprocating motion to said connecting link and said guiding means.

32. A slide drive device, according to claim 30, further comprising:

first and second drive branching links separately coupled to said guiding means; and said first and second drive branching links being effective to transfer said guiding displacement to the first and second toggle links respectively, whereby said slide is driven in said stroke.

33. A slide drive device, according to claim 32, wherein:

said means for adjusting said slide drive device being a single, shared means for adjusting said slide drive device on which the motion of each of said at least one drive branching link is dependent.

34. A slide drive device, according to claim 32, wherein:

said first and second drive branching links transmit said adjustment of said slide to said first and second toggle links, whereby said slide is adjusted in said stroke.

35. A slide drive device, according to claim 34, further comprising:

said first and said second upper toggle means;

a rotation center in each said first and second upper toggle means;

said rotation center permitting said first and second upper toggle means to rotate in an arc;

a first link connects each said rotation center to said at least one drive branching link;

a first and a second lower toggle link;

a second link operably connects each said rotation center to each respective said lower toggle link; and said first and second upper toggle means being effective to transfer said guiding displacement through said second links to respective said first and second lower toggle links and said slide whereby said slide operates through said cycle while maintaining a left and right balance.

36. A slide drive device for a press machine having a slide, comprising:

an adjusting mechanism in said slide drive device having a top and a bottom dead center positions;

said adjusting mechanism permitting an adjustment without changing said one dead center position;

said adjustment changing said other dead center position of said slide; and said adjusting mechanism being pivotable about a center position to adjust a stroke of said slide.

37. A slide drive device for a press machine having a slide, comprising:

an adjusting mechanism for adjusting a stroke of said slide;

a connecting link, coupled to said adjusting mechanism, for transferring a reciprocating motion of said adjusting mechanism;

a guiding mechanism, coupled to said connecting link, for converting the reciprocating motion of the adjusting mechanism into a linear motion;

first and second drive branching links, separately coupled to the guiding mechanism, for transferring the linear motion into a toggling motion;

first and second toggle links, respectively coupled to the first and second drive branching links, for being toggled by the drive branching links; and a plunger coupled to the first and second toggle links, and said plunger coupled to the slider to convert the toggling motion into a stroking motion of the slider.

38. A slide drive device for a press machine of claim 37, further comprising:

first and second balancer links coupled to the first and second toggle links respectively;

first and second balancers connected to the first and second balancer links respectively such that when the first and second toggle links move the first and second balancer links, the first and second balancers move in an opposite direction of the slide.

* * * * *